J. H. HUMPHRYES.
APPARATUS FOR DRIVING PIPES AND THE LIKE.
APPLICATION FILED JULY 24, 1917.
1,295,320.
Patented Feb. 25, 1919.
3 SHEETS—SHEET 1.
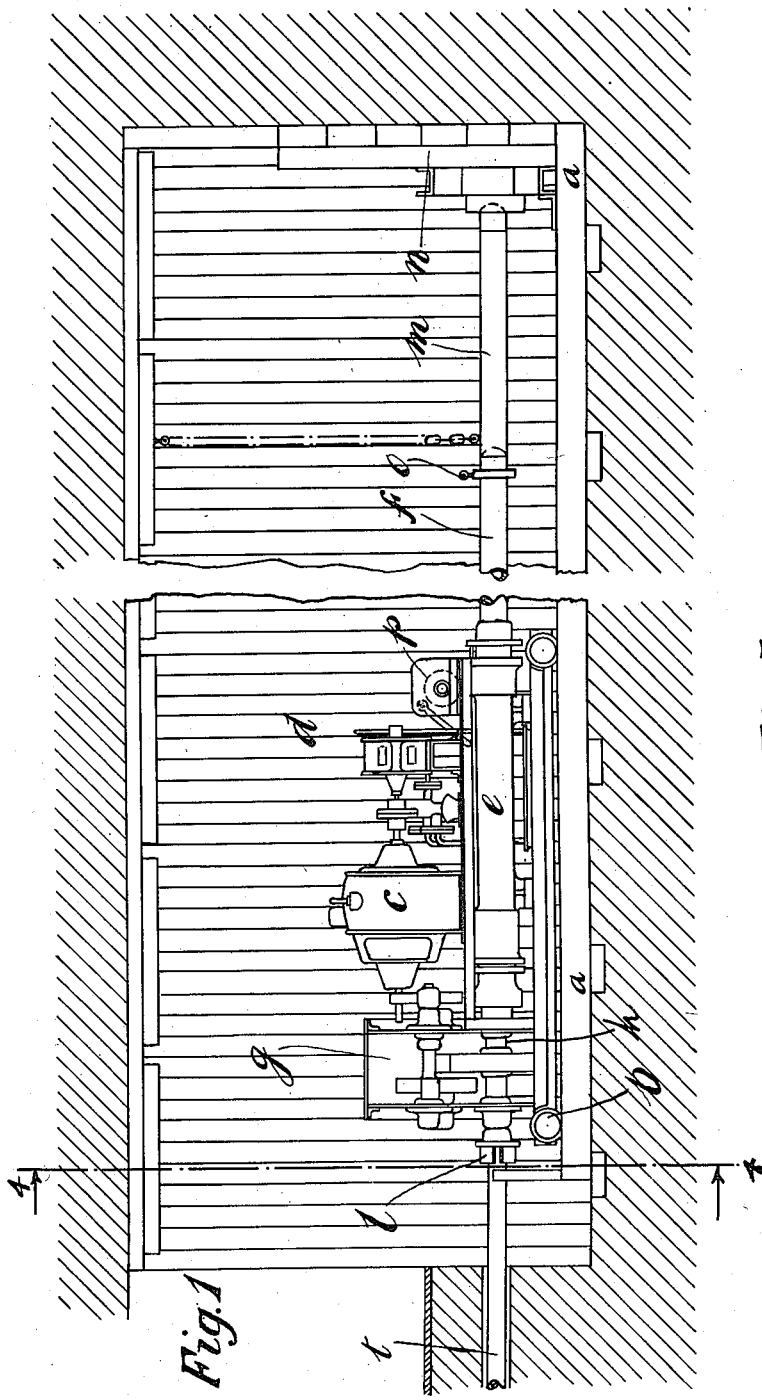
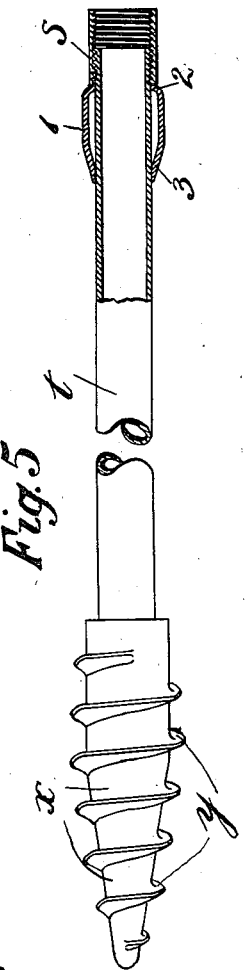

J. H. HUMPHRYES.
APPARATUS FOR DRIVING PIPES AND THE LIKE.
APPLICATION FILED JULY 24, 1917.

1,295,320.

Patented Feb. 25, 1919.
3 SHEETS—SHEET 2.

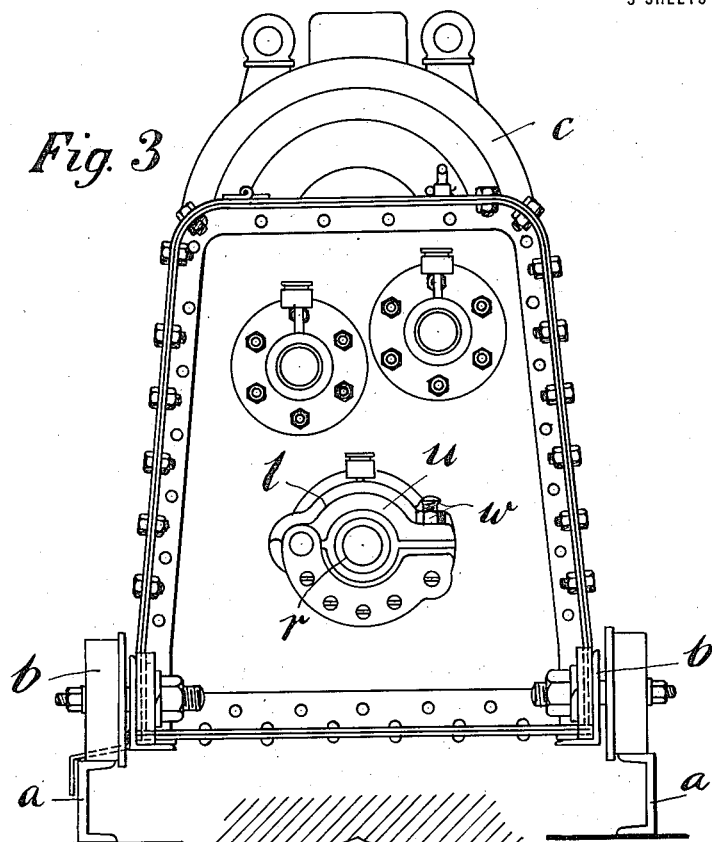
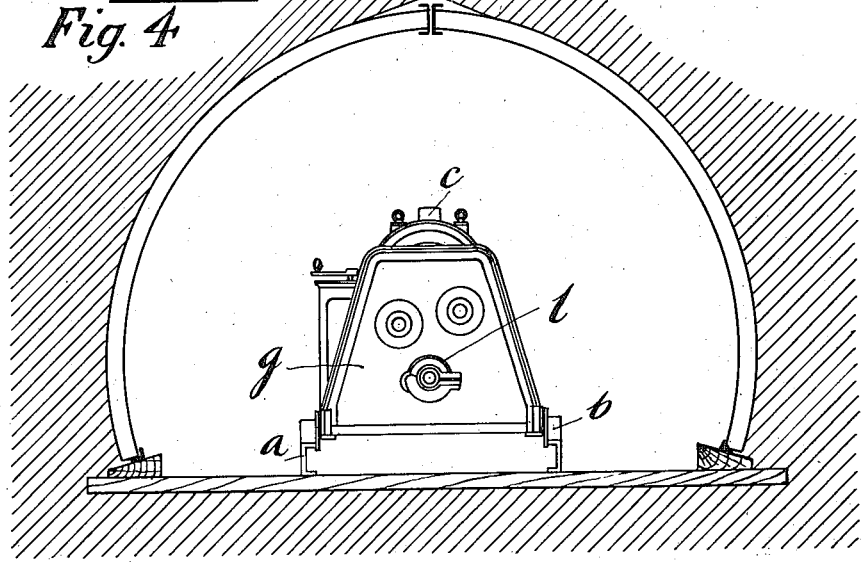

UNITED STATES PATENT OFFICE.

JAMES HULSE HUMPHREYS, OF LONDON, ENGLAND.

APPARATUS FOR DRIVING PIPES AND THE LIKE.

1,295,320.    Specification of Letters Patent.    Patented Feb. 25, 1919.

Application filed July 24, 1917. Serial No. 182,595.

*To all whom it may concern:*

Be it known that I, JAMES HULSE HUMPHREYS, of the firm of Braithwaite & Co., formerly Braithwaite & Kirk, of 117 Victoria street, London, S. W., manufacturers, subject of the King of Great Britain, have invented a new and useful Improved Apparatus for Driving Pipes and the like, of which the following is a specification.

This invention comprises an improved apparatus for driving or pushing pipes and the like and is more particularly intended for driving a line of pipes through soil either horizontally, vertically, or at an inclination for oil bores forming culverts or for any other purpose.

Hitherto pipe driving apparatus has comprised a hydraulic ram or a geared pusher with means for engaging the end pipes and forcing them one length after another into the soil at the desired level according to the operation or purpose for which they are intended. The pipes have a socket at the rear end and successive pipes engage sockets of pipes immediately before them and are connected up into a line and the whole line is driven forward as each succeeding length comes under the action of the ram or pusher.

The object of the present invention is to increase considerably the length of the line of pipes that may be driven through the soil in this way without previous boring operations and accordingly I combine with such means as a hydraulic ram for the push means, such for example as a capstan for rotating the pipes and a screw or forcing head on the pipes so that the advantage of a screwing action may also be obtained. I employ a worm or helically threaded leading piece or forcing head preferably of larger diameter than the pipe at the advancing end of the leading pipe which acts as an auger boring into the ground and greatly facilitates the driving as a bore is formed by the head which the pipes work in. But this bore is not formed by cutting out soil which requires to be removed by a water jet or the like from the pipes. And moreover the screwing action of the thread of this forcing head as it is rotated tends to draw the pipes forwardly and considerably reduces the pressure necessary for the drive. Further by means of the invention I may if desired connect the lengths of pipes together by screwing their spigot and socket ends or by the attachment of screwed union to the rear ends and threading the leading ends so that they thread home into the unions in the action of driving. Thus a much more secure line is formed in addition to the greater distances the line of piping may be driven. A still further advantage of the screwing action resulting from the invention is that the line of piping will better maintain its true direction and alinement. If desired instead of screwing the pipes a castellated joint between the ends of the pipes and a surrounding coupling with pins through same and through each pipe end may be used.

On the drawings:—

Figure 1 is an elevation of a suitable driving apparatus.

Fig. 3 is an end view of Fig. 2 looking from the left.

Fig. 4 is a sectional view on line 4—4 of Fig. 1.

Fig. 5 is a part sectional view of a leading pipe showing the screwing head, and a grease box around the rear end of the pipe.

Figure 7:
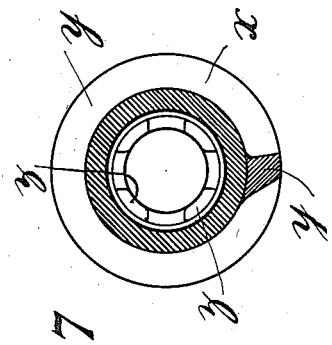
Fig. 7 is a section on line 7—7 of Fig. 6 looking from the right.
Figure 2:
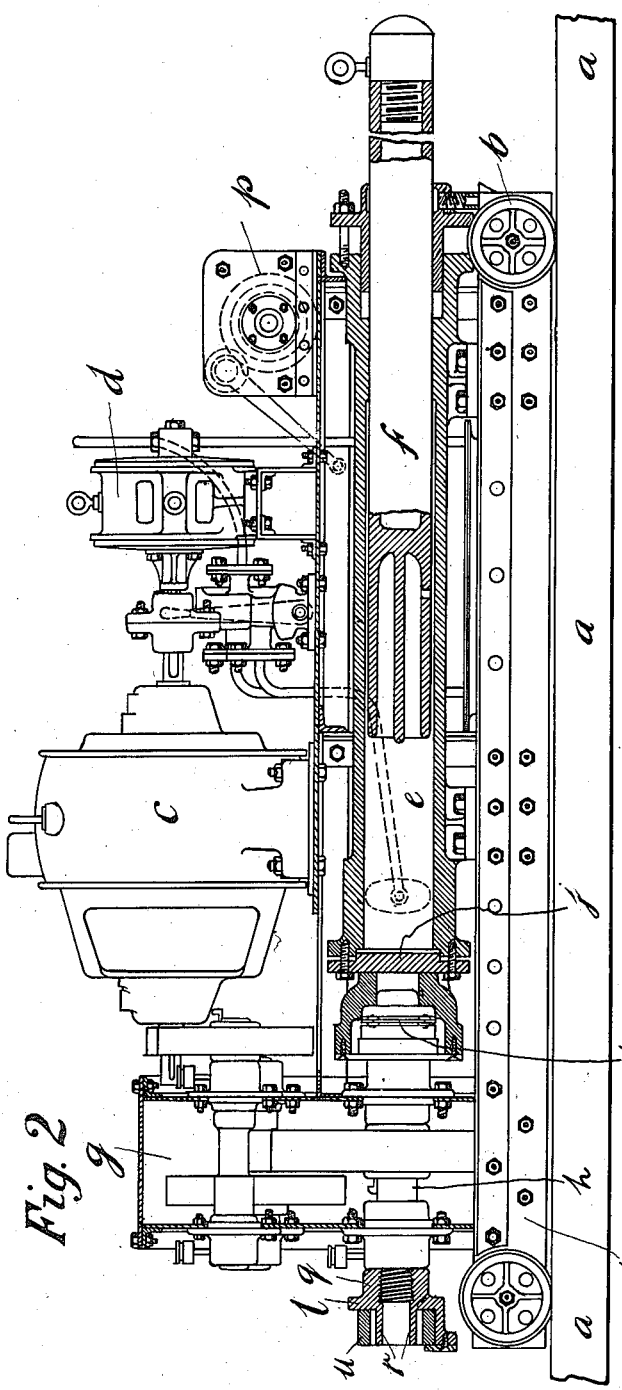
Fig. 2 is a part sectional view of the apparatus drawn to a larger scale.

In this illustrated example I have shown the means for imparting the rotary motion as a spur gear capstan driven by an electric motor, but it will be obvious that any other gear such as a worm drive from the motor to the capstan spindle may be employed; or other means than a capstan for rotating the pipe system may be employed. For example a hydraulic motor may be used between the electric motor or other source of power and the chuck or like means engaging the pipes. The electric motor may drive the pump for working the hydraulic ram for the pushing action and for supplying the liquid for the hydraulic motor to drive the chuck, the hydraulic motor avoiding the use of reduction gearing.

The drawing represents at *a* a track on which the running frame *b* may travel, and on the frame is marked an electric motor *c* driving a pump *d* for the operation of a hydraulic cylinder *e* and ram *f* mounted on the truck or running frame. At the other side the motor *c* drives the capstan *g* with spur reduction gear between the motor and the main spindle $h$ of the capstan. The head $j$ of the ram cylinder $e$ is adjacent to the spindle $h$ of the capstan and preferably co-axial therewith, and a thrust bearing such as $k$ is arranged between the capstan and the cylinder $e$. On the other end of the capstan spindle $h$ is the chuck $l$ for engaging the pipes as will be hereinafter described.

The cylinder $e$ is a short one in relation to the travel of the truck or running frame $b$ and to lengthen the stroke I may employ a movable strut $m$ which may be tubular, between the end of the ram $f$ and the sleeper wall or rear structure $n$ against which the thrust is made. The strut $m$ when the cylinder is returned may be swung aside away from the ram $f$ and the truck $b$ with the cylinder and capstan may be drawn back to the rear structure $n$ for the insertion of the pipe. The ram $f$ may be drawn into the cylinder by cable or the like from the eye $o$ by means of the windlass $p$ or the cylinder may be double acting. As the power is applied to the cylinder $e$ the latter is driven forward with the truck until its stroke is made and the ram $f$ is then drawn into the cylinder again and the lengthening strut $m$ is swung into the line and engaged by the end of the ram and another stroke is made. The strut is again swung out of line and the winch $p$ is connected by its cable with the rear structure $n$ and draws back the truck $b$ again to repeat the operation.

The illustrated arrangement is a convenient one as all the mechanism is contained on the truck and the motor may operate both the capstan and the pump thus providing either an equal or a variable distribution of power as may be found necessary in different classes of soil.

The capstan as stated is provided with a chuck $l$ for gripping the pipes to be driven. One form of suitable chuck comprises a disk member with a socket part $q$ adapted to be screwed on to the capstan spindle or a part connected thereto, and with a spigot projection $r$ at the center of the face of the disk of a size that will enter the screwed unions $s$ of the pipes $t$ which are being driven and of a depth corresponding to say half the length of the union, or any length to which it is desired the succeeding pipe end should enter the union. Around this spigot part $r$ and mounted on the disk are a pair of hinged jaws or members $u$, $v$, of a clip adapted to embrace the outside of the pipe unions $s$ and to be clamped on to same by a bolt $w$, Fig. 3 which may be hinged to one clip member $v$ and enter a bifurcation of the end of the other $u$ so that the nut need not be completely detachable from the bolt.

The pipes $t$ to be driven are threaded at each end and on one end of each a union $s$ is screwed so as to leave the union projecting sufficiently to receive and couple the forward end of the succeeding pipe, see Fig. 5.

Figure 6:
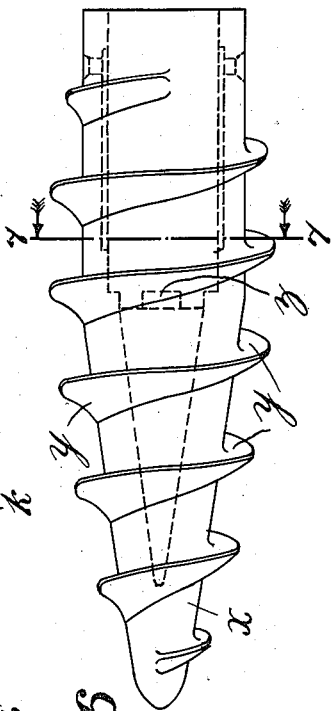
Fig. 6 is an elevation of the screwing head.

The leading pipe $t$ has firmly secured to its end the screwing head; this is here shown as a strong conical barrel part $x$ with a stout thread or threads $y$. Means must be provided for insuring that the head and pipe must turn together and that relative movement between them is avoided. For this purpose the end of the pipe may be notched or castellated to engage corresponding projections $z$ in the interior of the barrel $x$, see Fig. 6, or any equivalent keying devices may be employed. It may be convenient to form a helical thread integral with the end of a leading pipe.

The pipes $t$ are inserted one by one in the chuck $l$ of the capstan when the truck $b$ is drawn back as above described, and the chuck clip members $u$, $v$, are clamped around the union $s$ and the spigot part $r$ of the chuck enters the union and bears against the end of the pipe therein. The object of this is to prevent the rotary drive of the capstan from screwing the union farther on to the pipe instead of rotating the pipe in the desired manner to cause its forward end to enter the union of the preceding pipe which has been driven. When the forward end of the pipe is screwed home in the union of the preceding pipe the rotary drive of the capstan rotates the whole pipe system to assist the forward push of the power cylinder by a screwing action.

I find it desirable to provide on each pipe a grease box 1 Fig. 5, preferably of the same diameter as or slightly less than the barrel $x$ of the forcing head on the end of the leading pipe; a grease box 1 may be arranged in front of each union $s$ and may be in the form of a ring larger than the union and internally flanged at one end as at 2 to seat upon the pipe in front of the union, so as to be pushed forward as the pipe advances, and tapered as at 3 or curved down at its front end also to seat around the pipe. By this means the friction when the pipes are revolving is greatly reduced as the boxes keep the pipes clear of the earth bore and this with the presence of the lubricant in the space 4 facilitates the screwing action.

It will be understood that while I have given constructional forms and details of certain features of my improved apparatus my invention is not restricted to the use of same, but at present I believe the arrangement illustrated and set forth will enable the advantages of the invention to be fully reaped.

I claim:—

1. Means for driving pipes comprising in combination a screwing head on a leading pipe, a plurality of pipes with screwed ends and with unions screwed on their rear ends, a device for clutching said pipes, said device comprising means for attachment to a rotating part such as a spindle, a spigot part projecting therefrom to enter said unions and engage the ends of said pipes, and clipping members for clutching said unions, means for rotating said spindle carrying said clutching device, said means and said device being mounted on a traveling frame, and means for driving forward said traveling frame and so imparting a push as well as a rotating drive to the pipes.

2. Means for driving pipes comprising in combination a screwing head on a leading pipe, said head being larger in diameter than the pipe, a plurality of pipes with screwed ends and with unions screwed on their rear ends, lubricating sleeves mounted on said pipes, a device for clutching said pipes, means for rotating said device to impart a rotary drive to said pipes, said means comprising a gear capstan with means for driving same, said device and said rotary driving means being mounted on a traveling frame, and means for driving forward said traveling frame and so imparting a push as well as a rotary drive to the pipes.

3. Improved means for driving pipes through soil comprising a screwing head on the leading pipe and screwed forward ends on the other pipes to engage screwed unions on the rear ends of the pipes, lubricating sleeves mounted in front of said unions in said pipes, with means for rotating the pipes and means for imparting a forward push to the pipes as they are introduced one behind the other for driving.

4. Improved means for driving pipes through soil in which the leading pipe is provided with a screwing head, comprising in combination means for clutching a pipe, means for imparting rotary motion to said pipe clutching means, said means comprising a geared capstan and means for driving same, said clutching means and said rotary driving means being mounted on a traveling frame, and means for imparting a forward push to the pipes by driving forward the said traveling frame.

5. Improved means for driving pipes through soil in which the leading pipe is provided with a screwing head, comprising in combination means for clutching a pipe, means for imparting rotary motion to said pipe clutching means, said means comprising a geared capstan and means for driving same, said clutching means and said rotary driving means being mounted on a traveling frame, and means for imparting a forward push to the pipes by driving forward the said traveling frame said means comprising a hydraulic cylinder and ram.

6. Improved means for driving pipes through soil in which the leading pipe is provided with a screwing head, comprising in combination means for clutching a pipe, means for imparting rotary motion to said pipe clutching means, said means comprising a geared capstan and means for driving same, said clutching means and said rotary driving means being mounted on a traveling frame, and means for imparting a forward push to the pipes by driving forward the said traveling frame said means comprising a hydraulic cylinder and ram, said cylinder being mounted on said traveling frame and said ram being adapted for pressing against a rigid rear structure so as to drive forward said carriage as the ram is projected out of its cylinder.

7. Improved means for driving pipes through soil in which the leading pipe is provided with a screwing head, comprising in combination means for clutching a pipe, means for imparting rotary motion to said pipe clutching means, said means comprising a geared capstan and means for driving same, said clutching means and said rotary driving means being mounted on a traveling frame, and means for imparting a forward push to the pipes by driving forward the said traveling frame said means comprising a hydraulic cylinder and ram, said cylinder and ram having a shorter stroke than the travel of the carriage with a lengthening bar for enabling a second stroke to be taken.

8. Means for driving pipes comprising in combination a screwing head on a leading pipe, a plurality of pipes with screwed ends and with unions screwed on their rear ends, a device for clutching said pipes, a geared capstan on which said device is mounted, a motor for driving said capstan, a ram and cylinder for imparting a forward push to the pipes, a pump driven by said motor for actuating said ram, all of said driving mechanism being mounted on a traveling carriage, a rear structure to take the thrust of the ram and a lengthening rod for interposing between the said rear structure, and the said ram when drawn into its cylinder and after its first stroke has been made all substantially as described.

Dated this twenty-eighth day of June, 1917.

In testimony whereof I affix my signature.

JAMES HULSE HUMPHREYES.